United States Patent [19]

Onda et al.

[11] Patent Number: 4,962,564
[45] Date of Patent: Oct. 16, 1990

[54] CONCEALED WINDSHIELD WIPER SYSTEM

[75] Inventors: Kiyoshi Onda, Yokohama; Tomoo Nakajima, Ebina, both of Japan

[73] Assignee: Nissan Motor Co., Ltd., Kanagawa, Japan

[21] Appl. No.: 254,984

[22] Filed: Oct. 7, 1988

[30] Foreign Application Priority Data

Oct. 8, 1987 [JP] Japan ............................. 62-154446[U]
Oct. 8, 1987 [JP] Japan ............................. 62-154447[U]

[51] Int. Cl.⁵ .............................................. B60S 1/04
[52] U.S. Cl. ................................. 15/250.19; 296/192
[58] Field of Search ........................ 15/250.19, 250.16; 312/312; 296/192, 194

[56] References Cited

U.S. PATENT DOCUMENTS

| | | |
|---|---|---|
| 2,845,803 | 8/1958 | Price . |
| 2,895,157 | 7/1959 | Kocourek . |
| 2,936,477 | 5/1960 | Feiler . |
| 3,120,673 | 2/1964 | Buchwald . |
| 3,121,902 | 2/1964 | Massoll . |
| 3,225,376 | 12/1965 | Heiler . |
| 3,226,756 | 1/1966 | Heiler . |
| 3,290,715 | 12/1966 | Heiler . |
| 3,314,195 | 4/1967 | Ziegler . |
| 3,688,332 | 9/1972 | Bellware . |
| 3,694,846 | 10/1972 | Parker . |
| 4,770,462 | 9/1988 | Kuraoka ..................... 15/250.19 X |

FOREIGN PATENT DOCUMENTS

| | | |
|---|---|---|
| 40-2091 | 2/1969 | Japan . |
| 44-19207 | 8/1969 | Japan . |
| 57-27146 | 2/1982 | Japan . |
| 60-68849 | 5/1985 | Japan . |

*Primary Examiner*—Chris K. Moore
*Attorney, Agent, or Firm*—Pennie & Edmonds

[57] ABSTRACT

A concealed windshield wiper system is provided with a unique storage arrangement. A wiper pivot and a wiper drive motor mechanism are mounted on a platform of a lift mechanism. Arranged on this platform is a pivot container for storing the wiper pivot. The wiper blade carried by the wiper arm is stored in a wiper blade container formed on another platform of another lift mechanism. These lift mechanisms are operated via a cam and lever mechanism by a single lift drive motor mechanism. This assembly is stored in a cowl box between the rear edge of a hood and the lower end of a windshield of a vehicle. The pivot and wiper blade containers are lifted out of the cowl box to their lift positions according to a predetermined schedule. During operation of the wiper arm, only the pivot container is left in the lift position with the wiper blade lowered to the storage position thereof.

5 Claims, 9 Drawing Sheets

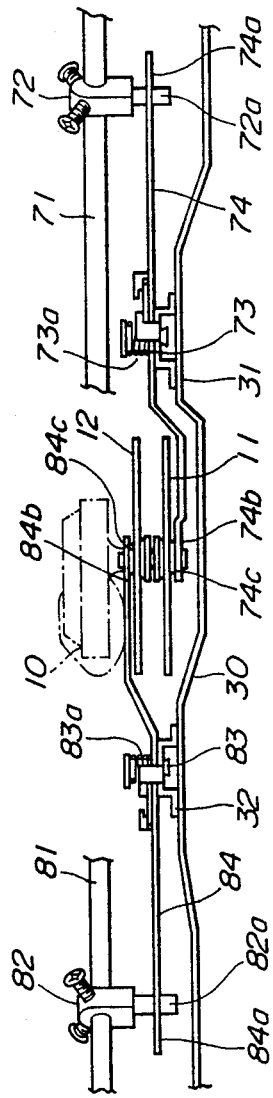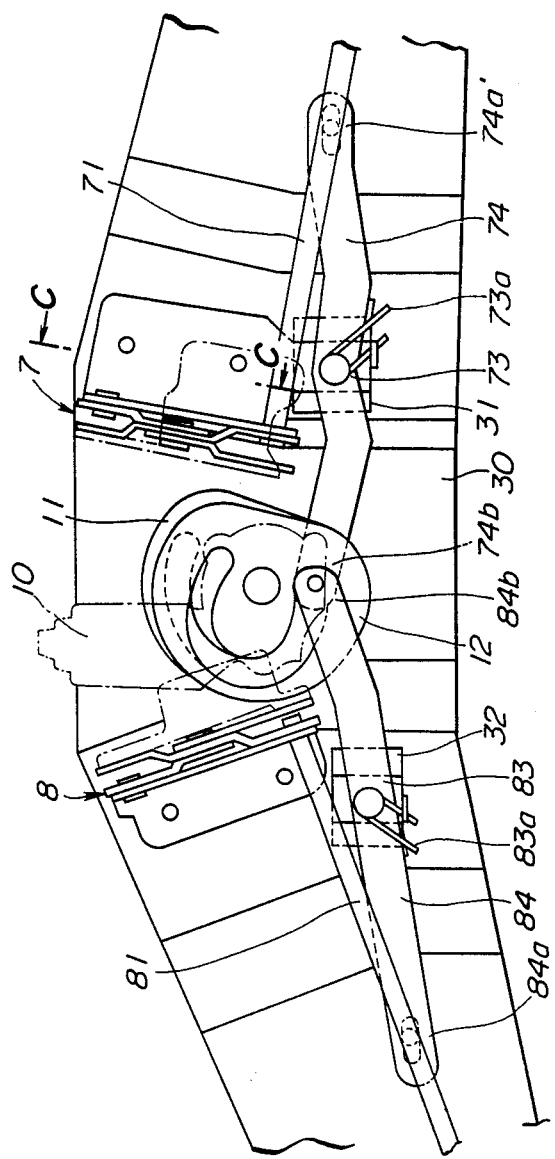

CONCEALED WINDSHIELD WIPER SYSTEM

BACKGROUND OF THE INVENTION

The present invention relates to a concealed windshield wiper system and more particularly to a storage arrangement of the concealed windshield wiper system.

JP-UM 60-68849 discloses a storage arrangement of a concealed windshield wiper system. According to this known storage arrangement, a lid closes a cowl box to conceal a windshield wiper assembly stored in the cowl box when the wiper is not in use. The lid is opened to allow the windshield wiper assembly to clean the outer surface of the windshield.

According to this known storage arrangement, the cowl box is left open when the windshield wiper assembly is in use. Thus, dust or dirt or the like is free to enter the cowl box, inducing a trouble of the windshield wiper system. Besides, it is not good that the inside of the cowl box is looked at. Recent car design trend demands that a windshield be more slanted and connects continuously with a hood. However, the continuity from the windshield to the hood is interrupted by the lid as it opens.

An object of the present invention is to provide a concealed windshield wiper system with a storage arrangement that interconnects a hood and a windshield without interruption of smooth connection of the outer surface of the windshield down to the rear edge of the surface of the hoof even when the windshield wiper assembly is in operation so as to enhance the appearance of the vehicle.

SUMMARY OF THE INVENTION

According to the present invention, in a vehicle, there are provided:
a hood with a rear edge;
a windshield;
a windshield wiper system including a wiper pivot with a wiper arm carrying a wiper blade;
a cowl box having an opening disposed between said rear edge of said hood and said windshield;
a pivot container which said wiper pivot of said windshield wiper system is stored in;
a wiper blade container which said blade of said wiper arm is stored in;
said pivot container and wiper blade container having storage positions, respectively, where they are disposed in said cowl box, and lift position, respectively, where they are projected out of said cowl box; and
means for lifting said pivot and wiper blade containers from the stored positions to the lift positions according to a predetermined schedule.

In one embodiment according to the present invention, a wiper pivot and a wiper drive motor mechanism are mounted on a platform of a lift mechanism. Arranged on this platform is a pivot container for storing the wiper pivot. The wiper blade carried by the wiper arm is stored in a wiper blade container formed on another platform of another lift mechanism. These lift mechanisms are operated via a cam and lever mechanism by a single lift drive motor mechanism. This assembly is stored in a cowl box between the rear edge of a hood and the lower end of a windshield of a vehicle. The pivot and wiper blade containers are lifted out of the cowl box to their lift positions according to a predetermined schedule. During operation of the wiper arm, only the pivot container is left in the lift position with the wiper blade lowered to the storage position thereof.

BRIEF DESCRIPTION OF THE DRAWINGS

FIG. 5(a) is a fragmentary front elevation of a practical form of a cam and lever mechanism;

FIG. 5(b) is a plan view of the cam and lever mechanism shown in FIG. 5(a);

DETAILED DESCRIPTION OF THE INVENTION

Referring to the accompanying drawings, the present invention is further described.

A preferred embodiment of the present invention is illustrated in FIGS. 1 to 12.

Figure 1:
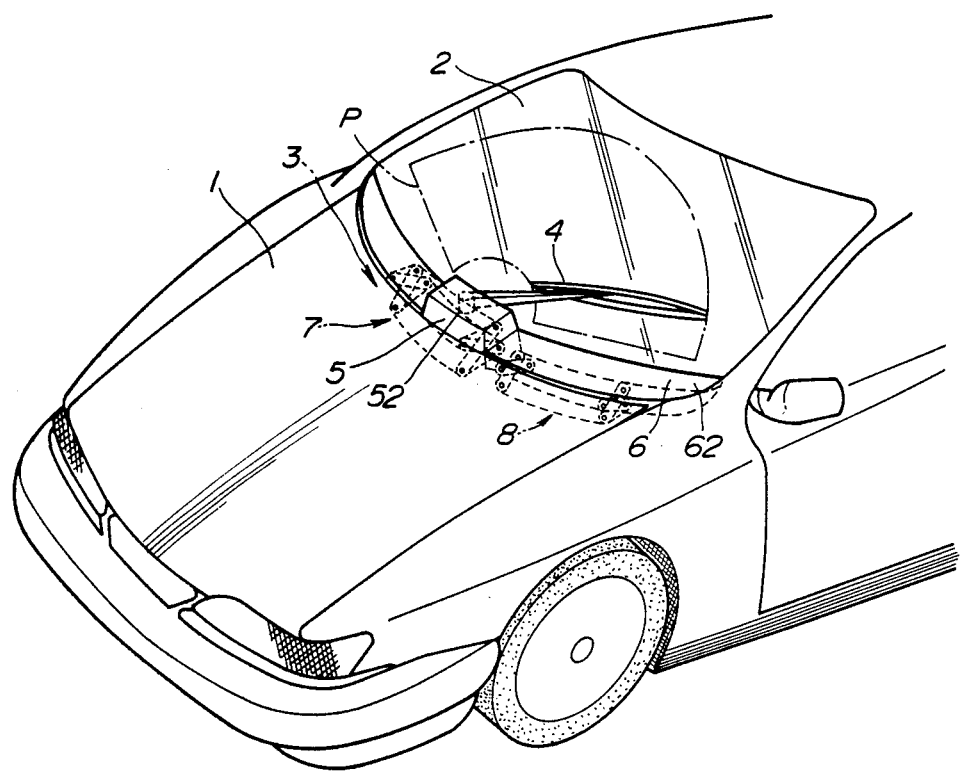
FIG. 1 is a perspective fragmentary view of a front half portion of an automotive vehicle equipped with a storage arrangement of a concealed windshield wiper system according to the present invention.

Referring particularly to FIG. 1, there is shown a front half portion of an automotive vehicle installed with a storage arrangement of a concealed windshield wiper system. FIG. 1 shows the position of parts of of the storage arrangement when a wiper blade 41 on a wiper arm 4 continuously wiping the surface of a windshield panel 2 of the vehicle. The vehicle includes a hood 1 with a rear edge 1a positioned in a spaced relationship with a lower edge 2a of the windshield panel 2 as best seen in FIG. 3. As readily understood from FIGS. 2, 3, and 4, a cowl box 3 is arranged between the rear edge 1a of the hood 1 and the lower edge 2a of the windshield panel 2. The concealed windshield wiper system is mounted within the cowl box 3. The storage arrangement comprises a pivot container 5 which is liftable out of the cowl box 3 to a lift position as illustrated in FIG. 1 by a lift mechanism 7, and a wiper blade container 6 which is liftable out of the cowl box 3 from a storage position as illustrated in FIG. 1 by a lift mechanism 8.

Figure 2:
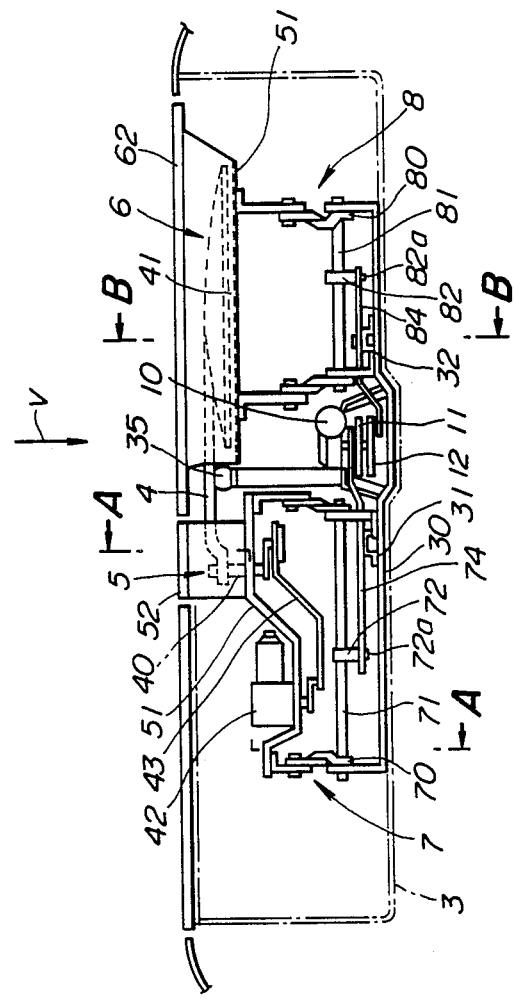
FIG. 2 is a section taken along a transverse plate passing through a cowl box of the vehicle showing a cam and lever mechanism with which a single lift drive mechanism operates lift mechanisms for pivot and wiper blade containers.
Figure 3:
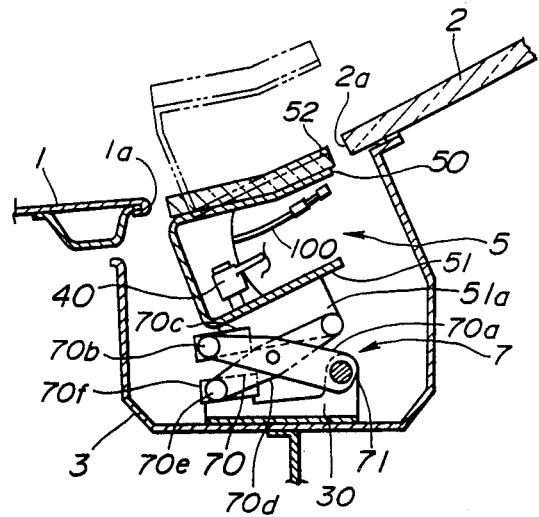
FIG. 3 is an enlarged section taken along the line A—A in FIG. 2.

As best seen in FIG. 2, the pivot container 5 is formed on a liftable platform 51. The liftable platform 51 is attached to the lift mechanism 7 mounted via an attachment base frame 30 on the bottom wall of the cowl box 3. Mounted on the platform 51 is a wiper motor 42 which is operatively connected to a pivot 40 by a wiper drive linkage in a conventional manner. The wiper pivot 40 extends into the pivot container 5 as best seen in FIG. 3. In a conventional manner, a wiper arm 4 extends radially outward the pivot 40 and carries a wiper blade 41. In a storage position as illustrated in FIG. 2, the wiper blade 41 is stored in the wiper blade container 6 which is formed on a liftable platform 61. The liftable platform 61 is attached to the lift mechanism 8 mounted via the attachment base frame 30 on the bottom wall of the cowl box 3. As viewed in FIG. 3, the pivot container 5 is open rearward and laterally, with respect to the vehicle body so as to allow movement of the wiper arm 4 from the storage position in the wiper blade container 6 and the subsequent swingable movement of the wiper arm 4. In FIG. 2, what is designated by the reference numeral 35 is a wiper stand which contacts with the wiper arm 4 to prevent firm engagement of the wiper blade 41 with the bottom wall of the wiper blade container 6 when in the storage position.

Referring back to FIG. 2, the lift mechanisms 7 and 8 include rotatable drive shafts 71 and 81. As shown in FIG. 3, the drive shaft 71 is rotatably mounted on the attachment base frame 30 and rotatable with a primary link plate 70a of a cross type lift linkage 70. The primary link plate 70a has one end fixedly coupled with the drive shaft 71 and an opposite end carrying a roller 70b received by a guide 70c fixedly secured to a bracket 51a secured to and extending downward from the platform 51. A secondary link plate 70d with a middle portion pivoted to the primary link plate 70a has one end pivoted to the bracket 51a and an opposite end carrying a roller 70e received by a guide 70f fixedly secured to the attachment base frame 30. Since the rollers 70b and 70e are rotatable along the associated guides 70c and 70f, clockwise rotation of the drive shaft 71 through a predetermined angle, viewing in FIG. 3, causes the platform 51 to lift the pivot container 5 from the fully drawn storage position to a lift position illustrated by the phantom line.

Figure 4:
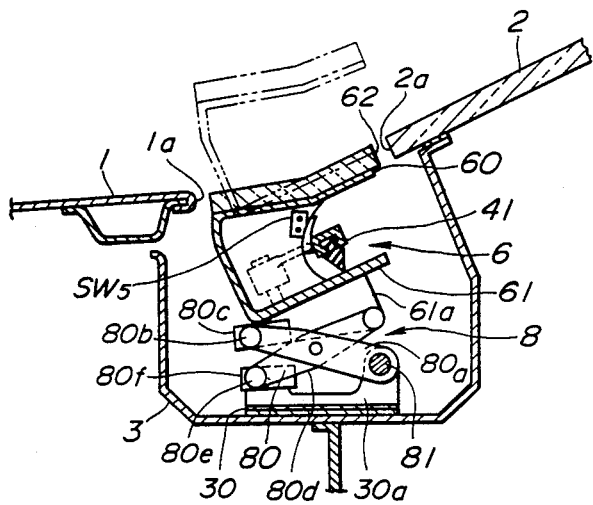
FIG. 4 is an enlarged section taken along the line B—B in FIG. 2.

As shown in FIG. 4, the drive shaft 81 is rotatably mounted on a bracket 30a fixedly secured to the attachment base frame 30 and rotatable with a primary link plate 80a of a cross type lift linkage 80. The primary link plate 80a has one end fixedly coupled with the drive shaft 71 and an opposite end carrying a roller 80b received by a guide 80c fixedly secured to a bracket 61a secured to and extending downward from the platform 61. A secondary link plate 80d with a middle portion povoted to the primary link plate 80a has one end pivoted to the bracket 61a and an opposite end carrying a roller 80e received by a guide 80f fixedly secured to a bracket 30a secured to the attachment base frame 30. Since the rollers 80b and 80e are rotatable along the associated guides 80c and 80f, clockwise rotation of the drive shaft 81 through a predetermined angle, viewing in FIG. 4, causes the platform 61 to lift the wiper blade container 6 from the fully drawn storage position to a lift position illustrated by the phantom line.

As shown in FIG. 2, the drive shafts 71 and 81 have arms 72 and 82 fixedly mounted for integral rotation. The drive shafts 71 and 81 are rotated by a single reversible lift motor mechanism 10 and a cam and lever mechanism. The cam and lever mechanism comprises a first lever 74 swingable about a pivot assembly 31 secured to the frame 30, a second lever 84 swingable about a pivot assembly 32 secured to the frame 30, a first rotary cam 11 operatively associated with an inner end of the first lever 74 which has an outer end operatively associated with one end 72a of the arm 72, and a second rotary cam 12 operatively associated with an inner end of the second lever 84 which has an outer end operatively associated with one end 82a of the arm 82. The inner ends of the first and second levers 74 and 84 have pins received in cam grooves or openings which the rotary cams 11 and 12 are formed with. These rotary cams 11 and 12 are fixedly coupled with an output shaft of the lift motor mechanism 10. The outer ends of the first and second levers 74 and 84 are formed with slots for receiving the one ends 72a and 82a of the arms 72 and 82, respectively. The cam grooves of the rotary cams 11 and 12 are contoured such that counterclockwise rotation of the rotary cams 11 and 12, as viewed along an arrow in FIG. 2, through approximately 45 degrees, causes the outer ends of the first and second levers 74 and 84 to rotate via the respective arms 72 and 82 the drive shafts 71 and 81 to rotate clockwise, viewing in FIGS. 3 and 4, through the predetermined angle. These rotations of the drive shaft 71 and 81 cause the lift linkages 70 and 80 to lift the platforms 51 and 61 with the pivot and wiper blade containers 5 and 6 thereon to their lifted positions as illustrated by the phantom line in FIGS. 3 and 4. Further description of the cam and lever mechanism is omitted since substantially same cam and lever mechanism is described later referring to FIGS. 5(a), 5(b), 6, 7(a), and 7(b) which show more practical embodiment of the present invention.

Referring back to FIGS. 3 and 4, the pivot and wiper blade containers 5 and 6 have covers 52 and 62 attached to top walls 50 and 60 thereof, respectively. When both the pivot and wiper blade containers 5 and 6 are in their storage positions, respectively, the covers 52 and 62 close the opening between the rear edge 1a of the hood 1 and the lower edge 2a of the windshield panel 2. Under this condition, the covers 52 and 62 are in flush with the adjacent outer surfaces of the hood 1 and windshield panel 2. Preferably, the covers 52 and 62 are made of a transparent material, such as a glass or an acryl-resin or a polycarbonate resin. The use of such material is advantageous in enhancing external appearance.

As shown in FIG. 3, a washer nozzle 100 is mounted in the pivot container 5. This arrangement of the washer nozzle 100 makes it easy for a designer to set an appropriate injection angle relative to the windshield panel 2 and make adjustment to point the nozzle 100 at an appropriate place to be injected. As shown by the phantom line in FIG. 4, when it is in the lift position, the bottom wall of the blade container 6 is elevated to substantially the same level as the outer surface of the windshield panel 2. This makes it easy for the wiper blade 41 to move out of the wiper blade container 6 onto the windshield panel 2 and vice versa. FIG. 4 also shows a detector switch $SW_5$ which produces an output signal when the wiper blade 41 is stored in the storage position within the wiper blade container 6. This detector switch $SW_5$ is used to control the wiper motor 42 and the lift motor mechanism 10 along with other switches SW₁, SW₂, and SW₃ which will be later described referring to FIGS. 8(a), 8(b) and 9.

Figure 6:
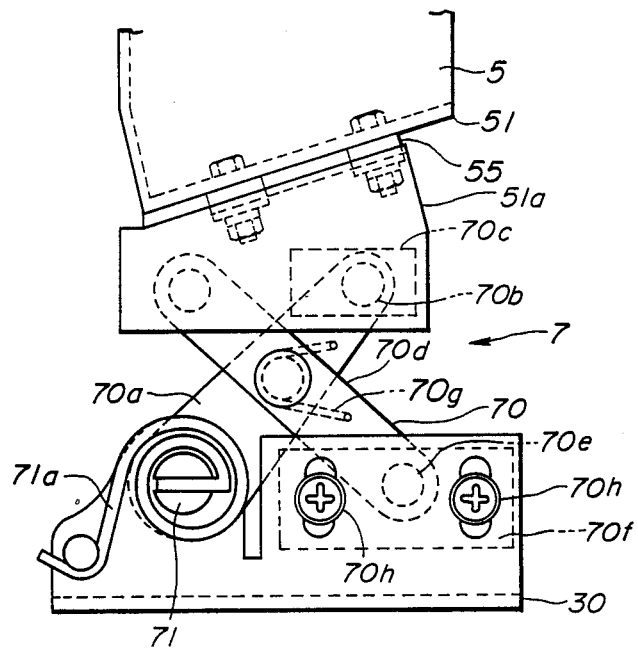
FIG. 6 is an enlarged fragmentary section taken along the line C—C in FIG. 5(b)

Referring to FIGS. 5(a), 5(b), 6, 7(a), and 7(b), a more practical form of a cam and lever mechanism and a more practical form of a lift mechanism are described which are alternative forms of the counterparts shown in FIG. 2. FIG. 5(b) is a fragmentary plan view of the cam and lever mechanism, FIG. 5(b) is a fragmentary elevation thereof, and FIG. 6 is an enlarged fragmentary section taken through the line C—C in FIG. 5(b). This cam and lever mechanism is different from that shown in FIG. 2 in that a drive shaft 7 is rotated counterclockwise through a predetermined angle, rather than clockwise, to lift a platform of a wiper pivot container 5. Thus, we viewed in FIG. 5(b), the setting is such that counterclockwise rotation of rotary cams 11 and 12, rather than clockwise rotation, through approximately 45 degrees causes a first lever 74 to swing clockwise about a shaft 73 of a pivot assembly 31 and a second lever 84 to swing counterclockwise about a shaft 83 of a pivot assembly 32. This movement of the first lever 74 causes the drive shaft 71 to rotate counterclockwise as viewed in FIG. 6, lifting the wiper pivot container 5 to the lift position as illustrated by the phantom line in FIG. 3. The movement of the second lever 84 causes the drive shaft 81 to rotate counterclockwise viewing FIG. 5(b) from the left, causing a lift of a wiper blade container.

Figure 7A:
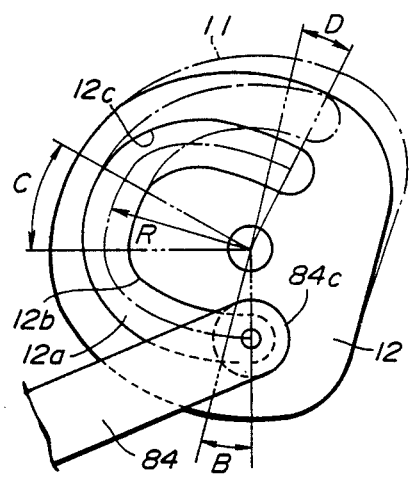
FIG. 7(a) is a fragmentary enlarged plan view of a rotary cam for the wiper blade container.
Figure 7B:
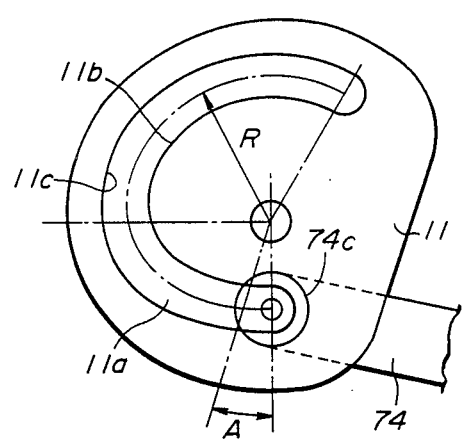
FIG. 7(b) is a fragmentary enlarged plan view of another rotary cam for the pivot container.

Referring particularly to FIGS. 5(a) and 5(b), the first lever 74 has a roller 74c, see FIG. 5(a), rotatably carried at an inner end 74b thereof. This roller 74c is rotatable along a curved elongate cam opening 11a, as best seen in FIG. 7(b), which the rotary cam 11 is formed with. An outer end 74a of the first lever 74 is formed with a slot receiving a reduced diameter end 72a of an arm 72 rotatable with the drive shaft 71. The first lever 74 is subject to a torque created by a coil spring 73a wound around the shaft 73 of the pivot assembly 31. The second lever 84 has a roller 84c, see FIG. 5(a), rotatably carried at an inner end 84b thereof. This roller 84c is rotatable along a curved elongate cam opening 12a, as best seen in FIG. 7(a), which the rotary cam 12 is formed with. An outer end 84a of the second lever 84 is formed with a slot receiving a reduced diameter end 82a of an arm 82 rotatable with the drive shaft 84. The second lever 84 is subject to a torque created by a coil spring 82a wound around the shaft 83 of the pivot assembly 32.

The lift mechanism 7 shown in FIG. 6 is different from the counterpart shown in FIG. 3 in that it further includes a coil spring 71a which preloads the drive shaft 71 counterclockwise as viewed in FIG. 6, and a coil spring 70g which is arranged so as to balance movements of link plates 70a and 70d during lifting operation. In order to adjust the level of the cover 52, the position of the guide 70f receiving the roller 70e is adjustable relative to a bracket secured to the attachment base frame 30 by loosening and the subsequent tightening of adjust screws 70h. In order to prevent transmission of noise and vibration, the wiper pivot container 5 is mounted via a mount rubber 55 to the lift mechanism 7. The counterpart to the lift mechanism 8 shown in FIG. 4 is modified in the same manner as the lift mechanism 7 shown in FIG. 3 has bee modified as described just about referring to FIG. 6 except the provision of the mount rubber. 55. Such mount rubber is not necessary for mounting the wiper blade container on the associated lift mechanism.

Referring to FIGS. 7(a) and 7(b), the cam opening 12a is designed such that during counterclockwise rotation of the rotary cams 11 and 12 through approximately 90 degrees from the illustrated position, the first and second levers 74 and 84 are urged to swing counterclockwise and clockwise, respectively, lifting the associated pivot and wiper blade container 5 and 6 (see FIGS. 3 and 4) to their lift positions. Further counterclockwise rotation of the rotary cams 11 and 12 through approximately 90 degrees, viewing in FIGS. 7(a) and 7(b), causes the second lever 84 to swing back counterclockwise to the illustrated position although the first lever 74 is left as it is. Thus, the wiper blade container 6 is lowered to the storage position as illustrated in FIG. 4.

Subsequently, if the rotary cams 11 and 12 are rotated clockwise as viewed in FIGS. 7(a) and 7(b), the second lever 84 swings clockwise until the wiper blade container 6 is lifted to the lift position and then the second lever 84 swings counterclockwise back to the illustrated position to lower the wiper blade container 6 concurrently with clockwise rotation of the first lever 74 back to the illustrated position to lower the pivot container 5 to the storage position thereof. During movement of the pivot and wiper blade container 5 and 6, the rollers 74c and 84c run along the inner peripheral edge 11b and 12b of the cam openings 11a and 12a, respectively. During downward movement of the pivot and wiper blade containers 5 and 6, the rollers 74c and 84c run against the outer peripheral edges 11a and 12a of the cam openings 11a and 12a, respectively. Thus, upward and downward movements of the pivot and wiper blade containers 5 and 6 are effected smoothly without any vibration. The cam openings 11a and 12a include play regions A, B, C and D where the distance from the center of rotation is unchanged and thus same. When the roller 74c passes through the region A, no movement of the first lever 74 is induced, while when the roller 84c passes through any one of the regions B, C, and D, no movement of the second lever 84 is induced. Thus, movement of the containers 5 and 6 due to the intertia is prevented.

Figure 8A:
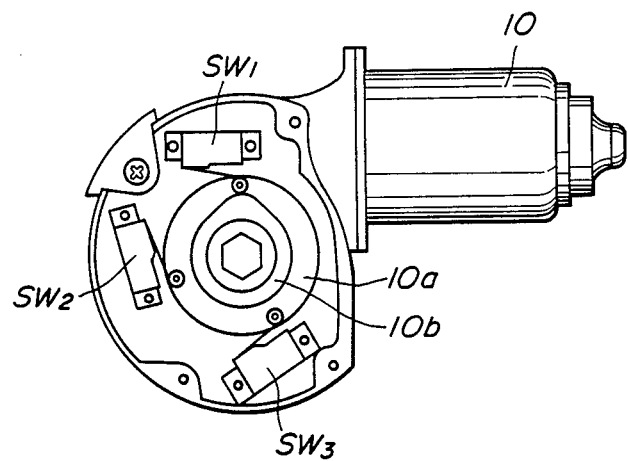
FIG. 8(a) shows a lift drive motor mechanism showing microswitches accommodated therein.
Figure 8B:
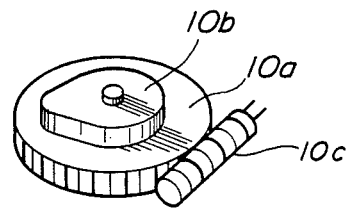
FIG. 8(b) is a perspective view of a worm gear assembly with a cam for activating the microswitches.
Figure 9:
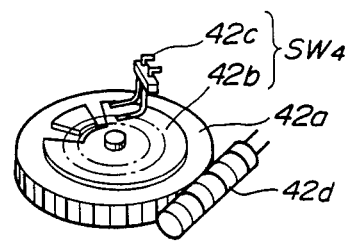
FIG. 9 is a perspective view of a worm gear assembly of a wiper drive motor mechanism showing the construction of a fourth microswitch.

Referring to FIGS. 8(a), 8(b), and 9, the lift drive motor mechanism 10 is described in detail. The drive motor mechanism 10 has a worm gear mechanism including a worm wheel 10a engaged with a worm shaft 10c rotatable with an output shaft of a motor, such as an electric motor. A cam 10b is arranged on the worm wheel 10a for rotation therewith with about a common axis. Arranged around the cam 10b are first, second, and third micro switches SW₁, SW₂, and SW₃ as best seen in FIG. 8(a). These switches are activated by the cam 10b on the worm wheel 10a. The first switch SW₁ functions to detect the pivot and wiper blade containers 5 and 6 taking their storage positions. The second switch SW₂ functions to detect the pivot and wiper blade containers 5 and 6 taking their lift positions thereof. The third switch SW₃ function to detect the wiper blade container 6 taking the storage position thereof.

FIG. 9 shows a worm wheel 42a and a worm shaft 42d of the wiper motor 42 (see FIG. 2) where the fourth microswitch SW₄ is arranged. The fourth microswitch SW₄ includes a contact disc assembly arranged on the worm wheel 42a for rotation therewith, and a pair of contact fingers 42c slidably engaged with the contact disc assembly 42b. This microswitch SW₄ functions to detect the wiper arm 4 taking the upper dead position P (see FIG. 1). The fifth microswitch SW₅ is arranged within the wiper blade container 6 as shown in FIG. 4. As mentioned before, this microswitch SW₅ function to detect the wiper blade 41 taking the storage position within the wiper blade container 6.

Referring also to FIGS. 10, 11, 12, and 1 in this order, the operation is now described.

Figure 10:
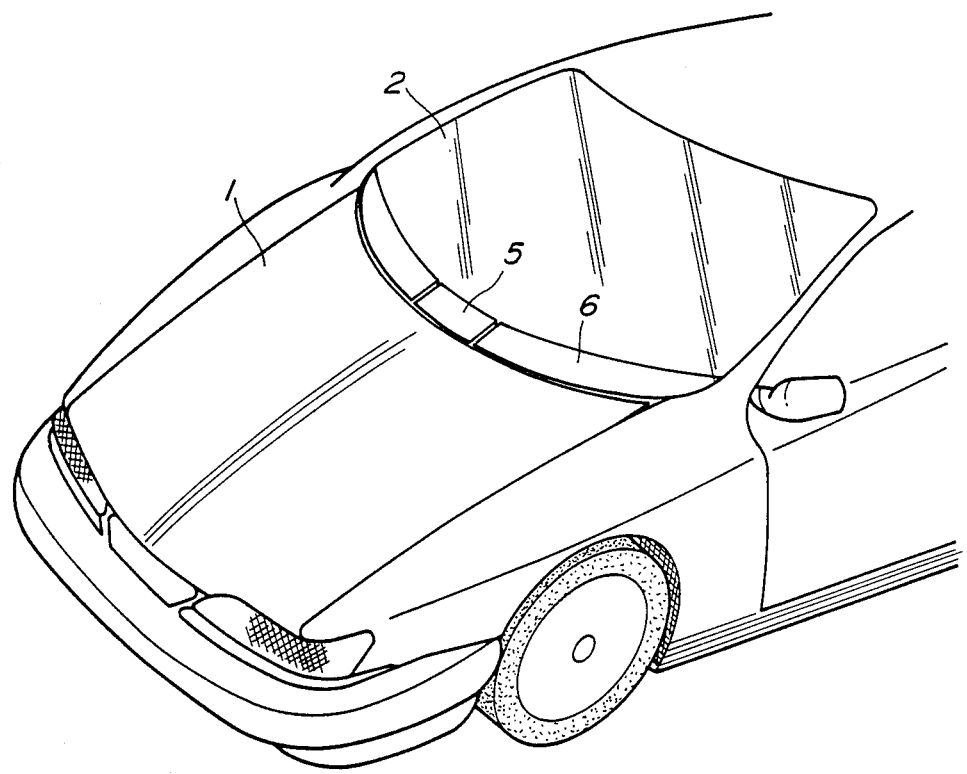
FIG. 10 is a similar view of FIG. 1 showing the position of parts when both the pivot and wiper blade containers are in their storage positions within the cowl box.
Figure 11:
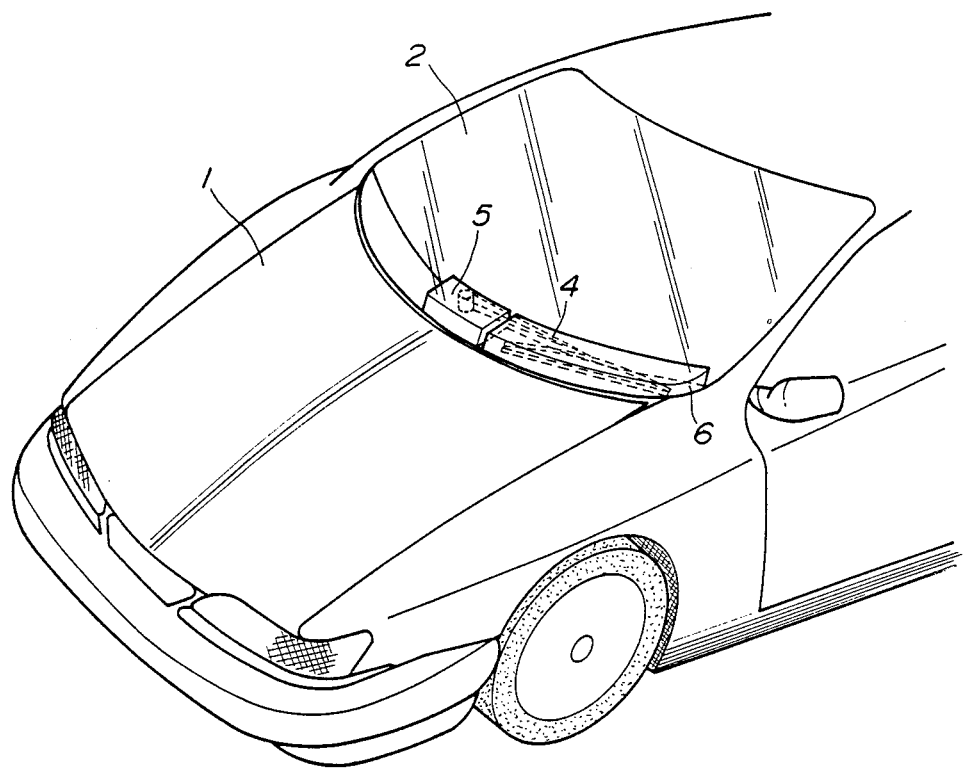
FIG. 11 is a similar view to FIG. 1 showing the position of parts when both the pivot and wiper blade containers are in their lift positions.
Figure 12:
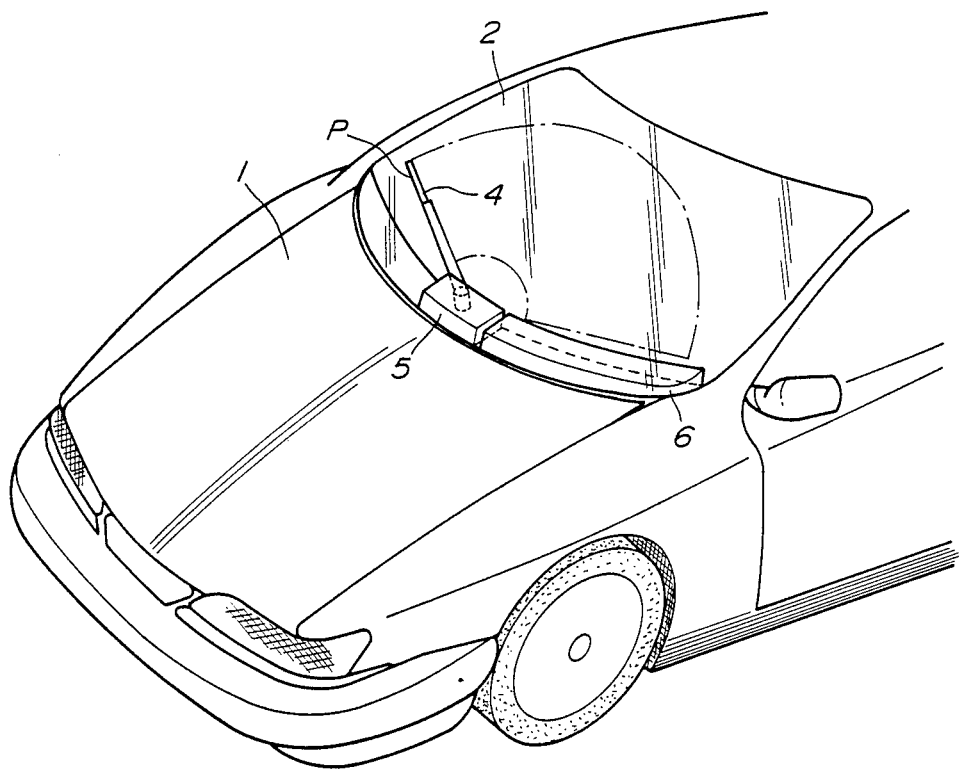
FIG. 12 is a similar view to FIG. 1 showing the position of parts when the wiper arm has reached the top dead center position.

FIG. 10 shows the position of parts when the wiper 4 is stored in the cowl box 3 within the pivot and wiper blade containers 5 and 6 staying in the storage positions thereof, respectively. Under this condition, when the wiper switch is manually turned to a predetermined ON position, the lift drive motor mechanism 10 begins to rotate the rotary cams 11 and 12 in a counterclockwise direction as viewed in FIGS. 7(a) and 7(b). This counterclockwise rotation of the rotary cams 11 and 12 causes the associated first and second levers 74 and 84 to swing about their shafts 73 and 83, respectively, rotating the associated drive shafts 71 and 81 counterclockwise as viewed in FIG. 5(b) from the right, thus causing the associated lift mechanisms 7 and 8 to lift the pivot and wiper blade containers 5 and 6 to the lift positions as illustrated in FIG. 11. After the counterclockwise rotation of the rotary cams 11 and 12 through approximately 90 degrees and thus upon completion of the lift movements of the pivot and wiper blade containers 5 and 6 upto the lift positions thereof, the second microswitch SW₂ is activated by the cam 10b. In response to the output of the second microswitch SW₂, the lift motor mechanism 10 stops, and the wiper drive motor 42 begins to rotate to drive the wiper 4. Then, the wiper blade 41 is moved out of the wiper blade container 6 onto the surface of the windshield panel 2. When the wiper 4 swings toward and reaches an upper top dead position P as shown in FIG. 12, the fourth microswitch SW₄ accommodated in the wiper drive motor 42 is activated or closed. In response to the output of the fourth microswitch SW₄, the rotation of the lift drive motor mechanisms 10 and thus further counterclockwise rotation of the rotary cams 11 and 12 resume. This further counterclockwise rotation of the rotary cams 11 and 12 cause the second lever 84 only to swing, causing the drive shaft 81 to rotate clockwise, thus lowering the wiper blade container 6 to the storage position thereof an illustrated in FIG. 1. During this movement, the pivot container 5 remains in the lift position thereof projected out of the cowl box 3. After the rotary cams 11 and 12 have rotated counterclockwise through another approximately 90 degrees and thus upon completion of the wiper blade container 6 taking the storage position, the third microswitch SW₃ is activated by the cam 10b. In response to the output of the third microswitch SW₃, the lift drive motor 10 stops.

Subsequently, when the wiper switch is turned to the OFF position, the lift drive motor mechanism 10 is activated to rotate in the opposite and clockwise rotation as viewed in FIGS. 7(a) and 8(b), causing the rotary cams 11 and 12 to rotate in the same rotational direction. The initial clockwise rotation of the rotary cams 11 and 12 through approximately 90 degrees causes the wiper blade container 6 only to be lifted to the lift position. The second microswitch SW₂ is activated when the wiper blade container 6 has taken the lift position, deactivating the lift drive motor mechanism 10 and activating the wiper drive motor mechanism 42. The wiper drive motor mechanism 42 cause the wiper 4 to move to the storage position within the wiper blade container 6 as shown in FIG. 4. The fifth microswitch SW₅ is activated when the wiper blade 41 has taken the storage position. In response to the output of the fifth microswitch SW₅, the wiper drive motor 42 is deactivated and the lift drive motor mechanism 10 is activated again. This causes the further clockwise rotation of the rotary cams 11 and 12. During this further clockwise rotation through another approximately 90 degrees, the pivot and wiper blade containers 5 and 6 are lowered to the storage positions, respectively, as shown in FIG. 10.

From the preceding description, it will now be understood that the pivot container 5 only remains out of the cowl box 3 during operation of the wiper 4, so that the driver's front view is not hampered and external appearance is enhanced.

It will also be appreciate that with the cam and lever mechanism both the pivot and wiper blade container 5 and 6 are operated by the single lift drive motor mechanism, so that the whole system can by snugly accommodated within the cowl box 3.

In the previous description, the covers 52 and 62 for the cowl box 3 have been attached to the pivot and wiper blade container 5 and 6, respectively. It is also possible to arrange these covers to open or close the cowl box in response to movements of the pivot and wiper blade containers 5 and 6. For example, such covers may be hinged adjacent the opening of the cowl box 3.

If desired, the concealed wiper system previously described may be modified such that it operates automatically in response to the output of a rain drop sensor.

What is claimed is:

1. In a vehicle including a windshield, a hood in a spaced relationship with the windshield, a cowl box having an opening disposed between the windshield and the hood:
    a windshield wiper system including a wiper pivot with a wiper arm carrying a wiper blade adapted to wipe a surface of the windshield;
    a pivot container which said wiper pivot of said windshield wiper system is stored in;
    a wiper blade container which said blade of said wiper arm is stored in;
    said pivot container and wiper blade container having storage positions, respectively, where they are disposed in said cowl box, and lift positions, respectively, where they are projected out of said cowl box; and
    means for lifting said pivot and wiper blade containers from the stored positions to the lift positions according to a predetermined schedule.

2. A vehicle as claimed in claim 1, wherein said lifting means include a lift mechanism supporting said wiper blade container, a lift drive motor mechanism rotatable in a predetermined rotational direction, and cam and lever means for lifting said wiper blade container to the lift position and then lowering said wiper blade container back to the storage position during a rotation of said lift drive motor mechanism in said predetermined rotational direction.

3. A vehicle as claimed in claim 1, wherein said pivot container remains in the lift position thereof during operation of said wiper blade wiping the surface of the windshield.

4. A vehicle as claimed in claim 3, wherein said wiper blade container is lowered to the storage position during operation of said wiper arm wiping the surface of the windshield.

5. A vehicle as claimed in claim 1, wherein said lifting means includes a single lift drive motor mechanism, lift mechanism supporting said pivot container and wiper blade containers, respectively, and a mechanism constructed and arranged so as to lift said pivot and wiper blade containers according to a predetermined schedule in response to rotation of said lift drive motor mechanism.

* * * * *